FIG. 2 is a view similar to FIG. 1 but illustrating the treatment of the fish material confined in closed containers.

DETAILED DISCUSSION OF THE PREFERRED EMBODIMENTS

Referring now to the drawing in detail, and first to FIG. 1 thereof, it may be seen therein that it illustrates an arrangement for performing the method of the present invention in an open system. The arrangement includes an oscillatory vessel 2 which is equipped, in a conventional manner, with supersonic sound transducers 4. The ultrasonic sound energy which is needed for the treatment is derived from ultrasonic sound generators 3 and conducted to the ultrasonic sound transducers 4.

The oscillatory vessel 2 is equipped with a drum 13 which is driven in rotation by a drive 9. The drum 13 has a closure 15 through which fish material, such as whole fish or fish pieces, such as fish fillet, can be introduced into, and the treated fish material can be withdrawn from, the interior of the drum 13. The oscillating vessel 2 will be filled with a flavoring liquid 1 during the operation of the arrangement, and the drum 13 is permeable to the treating or flavoring liquid 1 but impermeable to the fish material so that the latter is confined in the interior of the drum 13 but the flavoring liquid 1 can penetrate into and out of the drum 13. The fish material which is to be treated is introduced, at the beginning of the treating operation, into the interior of the drum 13 through the opening associated with the closure 15 so that it will be accommodated in the flavoring liquid 1 either to begin with, provided that the vessel 2 has been filled with the flavoring liquid 1 prior to the introduction of the fish material into the drum 13, or subsequently to the filling of the vessel 2 with the flavoring liquid 1 if the introduction of the flavoring liquid 1 takes place after the filling of the drum 13 with the fish material. When reference is being had to flavoring liquid or flavoring bath 1, it is to be understood that this may be a pure brine or saline solution, or pure vinegar or solution of acetic acid in water, or a solution, suspension or emulsion of a more complex composition including any or all of common salt, vinegar, sugar, pepper, onions, bay leaves, mustard seeds, the essences of above, and/or any other ingredients capable of influencing the taste of the treated fish material in a desirable manner.

After the filling of the drum 13, and the closing of the opening of the drum 13 by the closure 15, the drum 13 is set into a slow rotation by the drive 9 and the ultrasonic sound generators are energized so that the ultrasonic sound transducers 4 emit ultrasonic sound waves into the flavoring bed 1. Under these circumstances, the flavoring liquid 1 serves not only to flavor the fish material, but also simultaneously as a transmission medium for the energy of the ultrasonic sound waves. As a result of the action of the ultrasonic sound waves on the fish material, the tissue of the latter is loosened so that a substantial improvement in the tenderness of this tissue is obtained. In addition thereto, the ultrasonic sound waves act on the flavoring bath and on the flavoring ingredients thereof so as to enhance the penetration into the tissue of the fish material.

As further illustrated in FIG. 1, the treating vessel 1 is equipped with an inlet pipe 5 and an outlet pipe 6 which respectively serve to introduce the flavoring liquid 1 into and withdrawing such flavoring liquid 1 from the interior of the oscillatory vessel 2. Furthermore, there is provided a cooling arrangement 14 equipped with an inlet pipe 11 and an outlet pipe 12 through which a cooling medium is respectively admitted into and discharged from the cooling arrangement 14. The cooling arrangement 14 is operative for maintaining the temperature of the flavoring bath 1 within a predetermined temperature range, such as between 10° and 20° C.

The ultrasonic sound generators 3 and the ultrasonic sound transducers 4 are preferably operated in a 20 to 50 kHz, preferably at 40 kHz, the intensity of the ultrasonic sound waves being up to 2 W/cm². The treatment is continued, depending on the type and quality of the fish material, for 0.5 to 5 hours, this time period being also dependent on the ratio of the fish material to the flavoring liquid 1 which is advantageously kept between 1:2 and 2:1.

Advantageous results in pickling the fish material are obtained, again depending on the type of the fish material and also depending on the taste which is to be obtained for the final product or treated fish material, especially when the flavoring liquid 1 has a common salt content of between 3.5 and 12% and a vinegar content of 1.5 to 7%. Of course, the various parameters mentioned above can be varied in dependence on the properties of the particular fish material, to thereby vary the degree of saturation of the fish material with the flavoring agents as well as to alter the other qualities of the fish material in predetermined limits. The different properties of the fish material are caused, on the one hand, by natural causes in dependence on the particular type of fish to be treated and, on the other hand, by the state of the fish material, that is, whether the fish material consists of whole fish or of fish pieces or fillets, on the fact whether the fish tissue is frozen or not, and the like.

EXAMPLE 1

Advantageous properties, such as tenderness, and an excellent taste have been obtained when herring fillet has been treated in accordance with the present invention by operating the apparatus of FIG. 1 in accordance with the following parameters:
Frequency of the supersonic sound waves: 38 kHz
Intensity of the ultrasonic sound waves: 0.5 W/cm²
Duration of treatment: 2 h
Temperature of flavoring bath: 15° C.
Composition of flavoring bath: 2.5% acid, 4% NaCl
Ratio Fish:Bath: 1:1

It has been established that it is especially advantageous when the method of the present invention is performed in such a manner that the treatment of the fish material is conducted in two or more stages; then, the intensity of the ultrasonic sound waves will be varied from one of the stages to the other, and even the period of treatment may be different for each of the stages. This brings about the advantage that, inasmuch as the state of the fish material can be relatively quickly tested in the interim between the two stages, it is possible to control the duration and the intensity in the following stage in dependence on the state of the fish material which has been obtained while the fish material has been treated in the first stage.

EXAMPLE 2

Herring fillet has been preliminarily treated in accordance with the parameters listed in Example 1, except

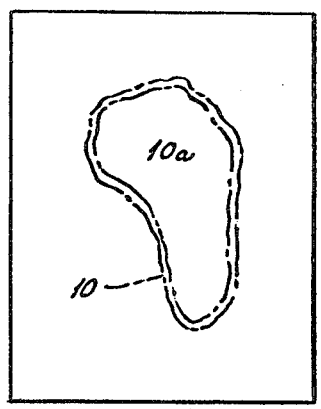
STATION III
PICK UP
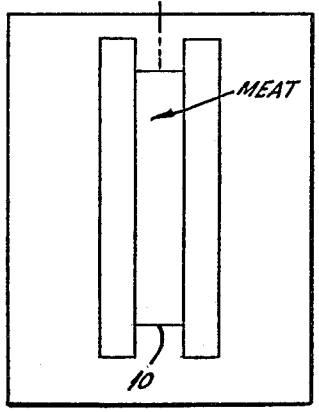
STATION IV
ELECTRIC CURRENT COOKING
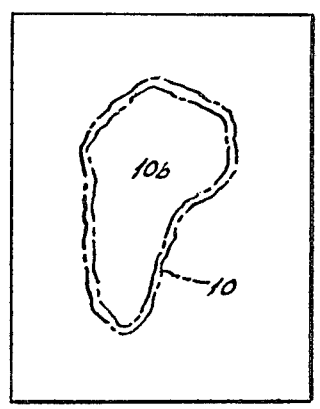
STATION V
DROP-OFF
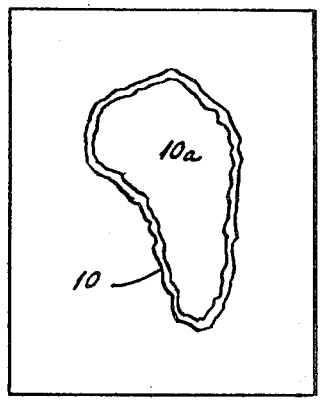
STATION II
TOP SURFACE
RADIANT BROILING
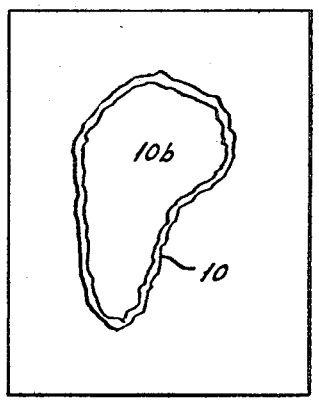
STATION VI
BOTTOM SURFACE
RADIANT BROILING
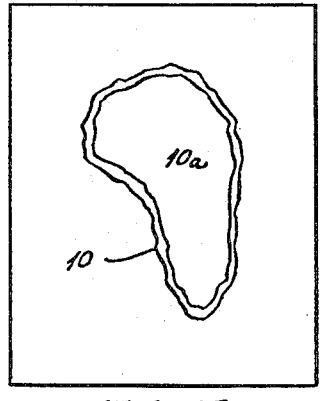
STATION I
LOAD
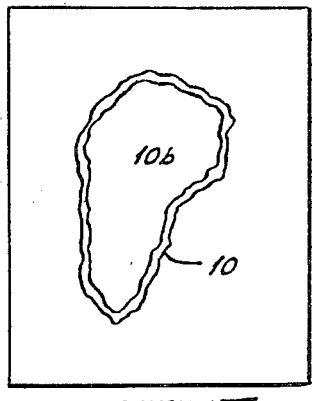
STATION VII
UNLOAD
FIG. 1.

RADIATION AND ELECTRIC CURRENT COOKING OF MEAT

This application is a division of application Ser. No. 042,747, filed May 29, 1979, now U.S. Pat. No. 4,244,284.

The present invention relates, in general, to food processing and, in particular, to an apparatus and method for cooking meat, such as steaks, and the like.

Most consumers of certain meat products, such as steaks, require that the meat be cooked to a desired degree of cooking and be served in an appealing manner. The meat should taste good and look good. Satisfying these two requirements is especially difficult in restaurants or for large gatherings, because the chef must cook for so many people at the same time. Furthermore, from the standpoint of the server of the meat product, there should be as little meat moisture loss as possible in the meat preparation to assure serving properly sized portions from properly sized pieces of raw meat.

Many types of cooking equipment are available commercially or have been suggested in the past. Generally, however, this equipment does not provide an efficient and effective solution to the concurrent problems of proper meat preparation and heavy cooking loads. Some have been designed for precise cooking but cannot handle effectively a variety of different orders at substantially the same time. Others have been arranged for mass cooking but fail to produce meat cooked to the individual tastes of different consumers. Yet others are designed for mass cooking with no concern as to the specific degree of cooking of the meat.

Therefore, it is an object of the present invention to provide a new and improved apparatus and method for cooking meat.

It is another object of the present invention to provide a meat cooking apparatus and method capable of preparing, in a rapid and efficient manner, meat products cooked to satisfy a variety of individual tastes under heavy cooking load conditions.

It is a further object of the present invention to provide a meat cooking apparatus and method which results in a minimum moisture loss of the meat as it is prepared.

In accordance with the present invention, a piece of meat is subjected to electric current heating to cook the meat and radiant broiling to char its surface. While the meat is being cooked electrically, the interior temperature of the meat is sensed and compared against a preset temperature which corresponds to the desired degree of cooking of the meat. This comparison is used to regulate the degree of electrical cooking of the meat by the passage of electric current through the meat. A conveying mechanism, which carries the meat through the cooking and broiling stages without manual handling, renders this operation automatic.

For a better understanding of the present invention, reference is made to the following description, taken in conjunction with the accompanying drawings in which:

FIG. 1 illustrates the sequence of functions performed by the apparatus and method of the present invention;

Figure 2:
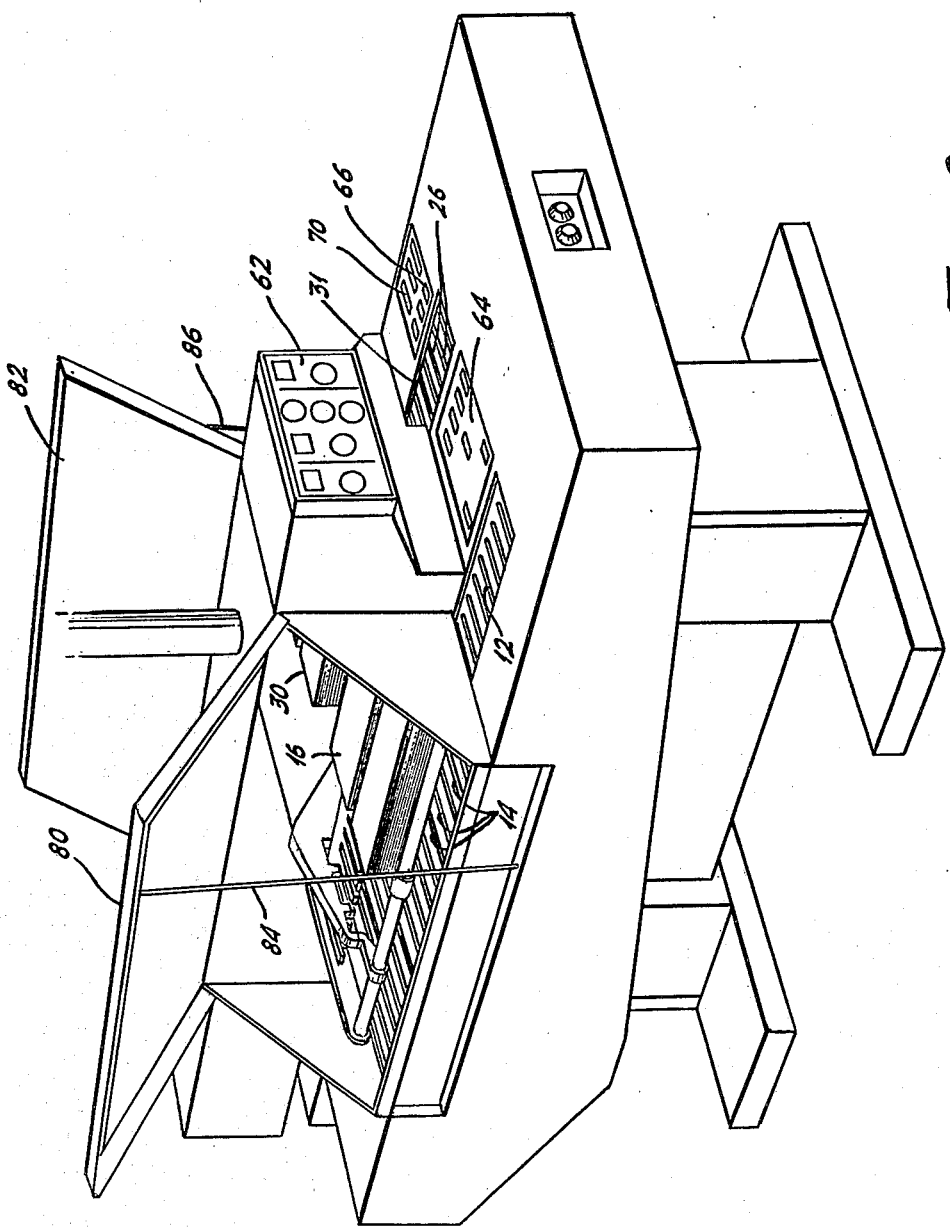
FIG. 2 is a perspective view of a preferred embodiment of meat cooking apparatus constructed in accordance with the present invention.

FIG. 1 shows the sequence of functions performed by the apparatus and method of the present invention. A piece of meat 10, which is to be cooked, is loaded into the cooking apparatus at STATION I and moved to STATION II where the top surface 10a of the meat is subjected to radiant broiling to soften the meat. The meat then is moved to STATION III where it is picked up and moved to STATION IV for electric current cooking. At STATION IV, electric current is passed through the meat in a regulated manner. After electric current cooking, the meat is dropped off at STATION V with the bottom surface 10b now on top. The meat then is moved to STATION VI and surface 10b, which is now on top, is subjected to radiant broiling to char this surface. Finally, the cooked piece of meat, with surface 10b charred, is moved to STATION VII for unloading from the cooking apparatus.

Referring to FIGS. 2, 3, 4 and 5, a piece of meat 10 is loaded into the cooking apparatus of the invention through an opening 12. Although the embodiment illustrated contemplates manual loading, a suitable automatic loading mechanism may be provided to meet the practical requirements of the installation. The meat is set on a plurality of rods 14 which form part of the conveying mechanism for moving the meat through the cooking apparatus. The conveying mechanism will be described in greater detail below.

The meat is moved to a position below a first radiant heater 16 which radiates the top surface 10a of the meat to soften the meat, if necessary. A piece of meat taken from a refrigerator has a temperature in the order of 40° F. As such, the piece of meat, and especially the fatty parts, is hard. In order to cook the piece of meat most effectively, the meat should be introduced to the electric current cooking station in a softened condition, whereby there is enhanced contact with the cooking electrodes. The details of radiant heater 16 will be described with reference to a second radiant heater 30, similar to heater 16, shown most clearly in FIG. 5. Radiant heaters 16 and 30 are aligned transversely of the apparatus. Each may include a series of infrared lamps 18 which line the interior surfaces of a pair of reflectors 20 and 21. Preferably, reflectors 20 and 21 are ceramic, self-cleaning reflectors which reflect the light emanating from lamps 18 onto the meat. The arrows associated with reflectors 20 and 21 indicate that the reflectors and lamps 18 may be swung into and out of position for cleaning and maintenance purposes. Lamps 18 may be of the quartz halide type, collectively capable of developing a temperature of approximately 1800° F. at the surface of the meat from a power output of about 10,000 watts for approximately 30 seconds. This infrared radiation will soften the meat at STATION II and produce an appearance comparable to charcoal broiling on surface 10b at STATION VI. The degree of softening is variable and may be controlled by providing a range of power outputs from 3000 watts to 10,000 watts over a time period of zero to 60 seconds depending on the softness or hardness of the meat as it is to be introduced into the cooking apparatus. The degree of charring is variable and may be controlled to produce a range of effects satisfactory to the average consumer by providing a range of power outputs from 3000 watts to 10,000 watts over a time period of 15 seconds to 60 seconds. Preferably, the degree of charring is set by fixing the power output and broiling time to produce the same satisfactory effect for all pieces of meat to be prepared. However, with suitable modifications, various charring effects may be produced to satisfy the individual desires of consumers.

After surface 10a is broiled, the meat is moved by the conveying mechanism to a position where it is engaged by a pair of electrodes 22 and 24 for electric current cooking of the meat. These electrodes are formed by a plurality of electrode fingers 22a and 24a, respectively, which are made from a carbon material. Carbon has been found to have the necessary characteristics which provide good contact with the meat for proper electric current cooking without sticking to the meat after cooking is completed, whereby the meat is easily released from the electrode fingers with no adverse effect on the appearance of the meat.

The electrode fingers are disposed perpendicular to the direction of movement of rods 14 and a similar set of rods 26 on the opposite side of the cooking apparatus. Fingers 22a and 24a are shaped and sized to permit fingers 22a to pass between rods 14 and fingers 24a to pass between rods 26 as the electrodes are moved between rods 14 and 26.

Normally, electrodes 22 and 24 are biased toward each other by suitable means, such as a spring. As the electrodes move into registration with rods 14, fingers 22a of electrode 22 pass between rods 14 to a position below these rods, while electrode 24 engages a detent 56 which prevents further movement of this electrode causing a separation of the electrodes. With fingers 22a below rods 14 and fingers 24a above rods 14, there is adequate clearance for rods 14 to move between the electrodes and deliver a piece of meat to this location between the electrodes.

After the meat has been delivered to this location, the electrodes are moved away from rods 14 and brought together to tightly engage the meat. The meat is carried to the cooking location by the electrodes.

Electric current is passed through the meat between electrode fingers 22a and 24a to cook the meat. In order to prevent a short-circuit, the cooking current is not applied until electrode fingers 22a clear rods 14. Preferably, the meat is cooked with the electrodes in a fixed vertical position, since such an arrangement simplifies the application of the current to the electrodes. The nature of the meat and the desired degree of cooking determine the amount of electric current heating which is required. With a fixed level of current, the time of cooking is varied to achieve the desired degree of cooking. Among the factors which may affect the required duration of cooking for a desired degree of doneness are the type and thickness of the meat, its moisture content, and the salt content.

Figure 3:
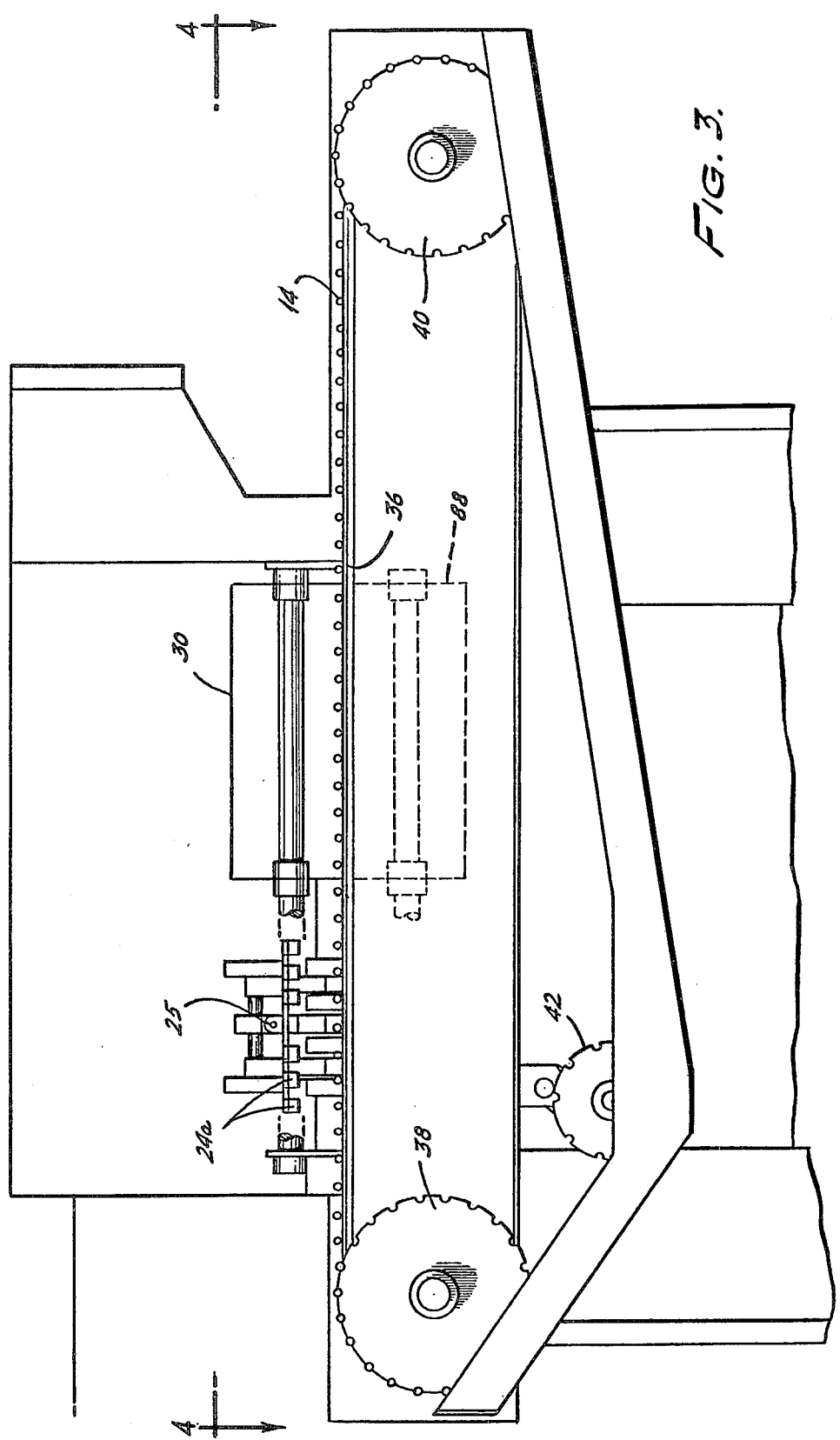
FIG. 3 is a partial side view of the FIG. 2 apparatus with the housing broken away.
Figure 4:
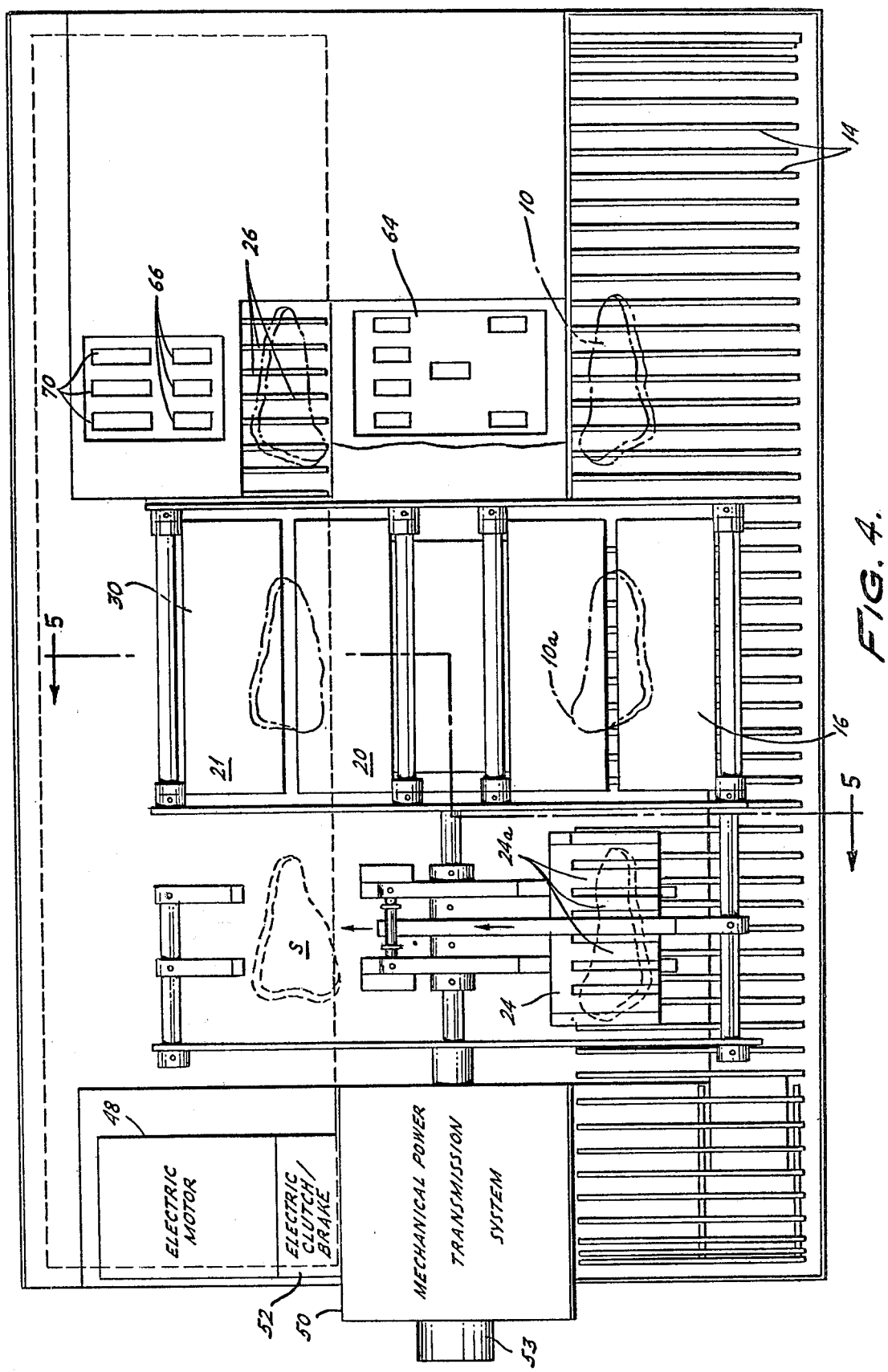
FIG. 4 is a sectional view taken along line 4—4 of FIG. 3.
Figure 5:
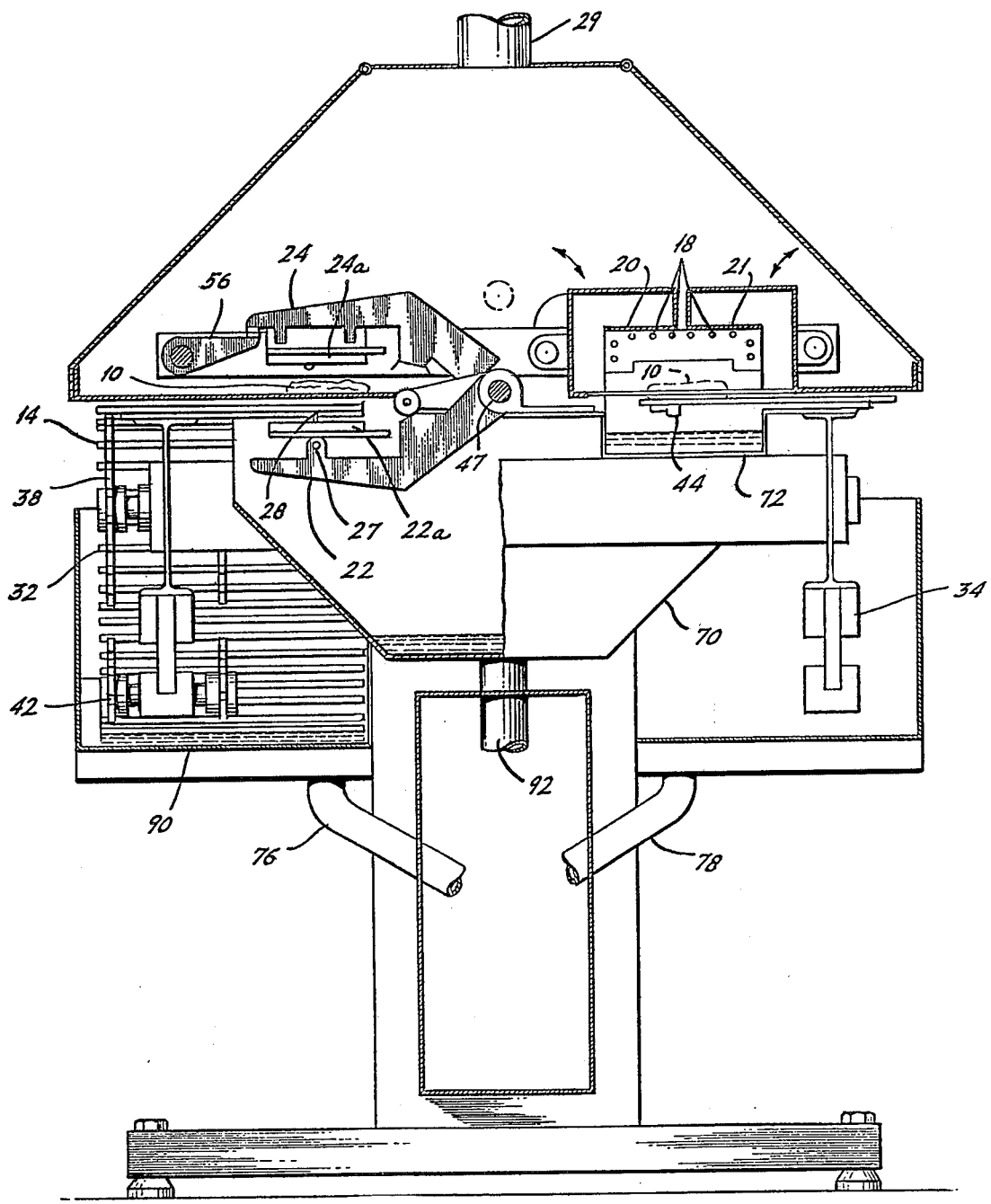
FIG. 5 is a sectional view taken along line 5—5 of FIG. 4.

Fingers 22a of electrode 22 and fingers 24a of electrode 24 are arranged to clamp a piece of meat tightly as the electrode heads are moved away from rods 14. As best seen in FIGS. 3 and 5, the electrode fingers are mounted for quadrature pivotal movement about two transverse axes to permit the electrodes to conform to thickness variations in the meat. Electrode fingers 24a pivot about a pin 25 (FIG. 3), while electrode fingers 22a pivot about pin 27 perpendicular to pin 25 (FIG. 5). As stated previously, the broiling of the meat by radiant heater 16 enhances the effectiveness of the electric current cooking in that the meat is delivered to electrodes 22 and 24 in a softened condition, whereby better contact between the electrode fingers and the meat surface is achieved.

A thermocouple 28, mounted on electrode 22, in electrical and thermal isolation from the electrode, penetrates bottom surface 10b of the meat as electrode fingers 22a engages this surface. The thermocouple senses the interior temperature of the meat as it is being cooked and develops a sensing signal representative of this temperature. Because of the direct correlation between the interior temperature of the meat and the degree of cooking of the meat, the thermocouple sensing signal is representative of the degree of cooking. This sensing signal is compared against a preset temperature input signal corresponding to the degree to which the particular piece of meat is to be cooked and the result of this comparison is used to control the duration of the electric current passing through the meat. In developing the setting for the preset temperature input signal, it has been found that for steaks, this temperature is between 120° F. and 160° F. for a "rare" cooking; 140° F. and 180° F. for a "medium" cooking; and 160° F. and 200° F., for a "well-done" cooking.

After the piece of meat has been cooked, the conveying mechanism moves the electrodes, carrying the meat, to a position where the meat is deposited on rods 26. The arrangement is such that the bottom surface 10b of the meat now is on top. As the electrode fingers move into registration with rods 26, fingers 24a of electrode 24 pass between rods 26 to a position below these rods, while electrode 22 engages a detent, similar to detent 56, which prevents further movement of this electrode causing a separation of the electrodes as the meat is deposited on rods 26. With fingers 24a below rods 26 and fingers 22a above rods 26, there is adequate clearance for rods 26 to move between the electrode fingers and carry away a piece of meat from this location between the electrodes. The meat then is moved by the conveying mechanism to a position below the second radiant heater 30 which broils bottom surface 10b of the meat to char this surface and develop the desired appearance.

After surface 10b is broiled, the meat is moved by the conveying mechanism to a position where it may be removed from the cooking apparatus through an opening 31. Unload opening 31 and load opening 12 are aligned transversely of the apparatus. As with load opening 12, a suitable automatic removal mechanism may be provided instead of the manual removal capability illustrated.

The conveying mechanism which moves the meat through the cooking apparatus includes an input conveyor 32 and an output conveyor 34. Input conveyor 32 and output conveyor 34 are disposed parallel to each other at opposite sides of the apparatus. They are located at the same height and arranged to move in opposite directions. Since the two conveyors preferably are similar, only the details of the input conveyor 32 will be described. Rods 14 are secured in a cantilevered manner at their outer ends to an endless chain 36 and to a second endless chain (not shown) at a point inward of the ends, for example, one-third of the rod length from the ends. The chains are driven longitudinally of the cooking apparatus by drums 38, 40 and 42 each having drive surfaces shaped to receive rods 14. The rods are supported transversely and are prevented from pivoting downwardly which would tend to occur especially when they carry pieces of meat by their attachment to the two chains and by an angle, such as the one shown in FIG. 5 as part of the output conveyor and identified by reference numeral 44. Angle 44 extends longitudinally of the apparatus, below the rods, and is inward of the inner chain. In this way, rods 14 are maintained horizontal and perpendicular to their movement are chain 36 is driven.

Electrodes 22 and 24 are positioned between input conveyor 32 and output conveyor 34 at a distance longitudinally of the apparatus from radiant heaters 16 and 30 equal to the longitudinal distance between load and unload openings 12 and 31 and the radiant heaters. The electrodes are mounted on a shaft 47 for pivotal movement between the conveyors. As this shaft is driven, the electrodes swing through 180° arcs extending between the conveyors and perpendicular to the disposition of the conveyors.

Input conveyor 32, output conveyor 34 and electrodes 22 and 24 are driven by a mechanical power transmission system 50 powered by an electric motor 48 through an electro-mechanical clutch/brake mechanism 52. Electric motor 48 is arranged to run continuously with its output coupled to mechanical power transmission system 50 at selected times by the control of clutch/brake mechanism 52. Movements of input conveyor 32, output conveyor 34 and electrodes 22 and 24 are started by actuation of control switches and stopped by an electro-mechanical timing device 53. The actuation of the control switches and the action of electro-mechanical timing device 53 causes engagement and disengagement of the clutch and brake of clutch/brake mechanism 52 to initiate and stop movements of input conveyor 32, output conveyor 34 and electrodes 22 and 24.

Mechanical power transmission system 50 may be of any suitable design which produces controlled movements of input conveyor 32 and output conveyor 34, whereby these two conveyors move in opposite directions, over fixed distances, intermittently at different times. Although not shown, mechanical power transmission system 50 may include a single-pin Geneva gear mechanism in which two diametrically opposed Geneva star wheels are driven to develop controlled rotational movements at the appropriate times. These rotational movements are coupled through appropriate gearing to input conveyor 32 and output conveyor 34 to effect fixed movements of the conveyors equal to the longitudinal distance between load and unload openings 12 and 31 and radiant heaters 16 and 30. This distance is equal to the longitudinal distance between radiant heaters 16 and 30 and electrodes 22 and 24.

Mechanical power transmission system 50 also provides the drive for shaft 47 which transfers electrodes 22 and 24 between input conveyor 32 and output conveyor 34.

Figure 6:
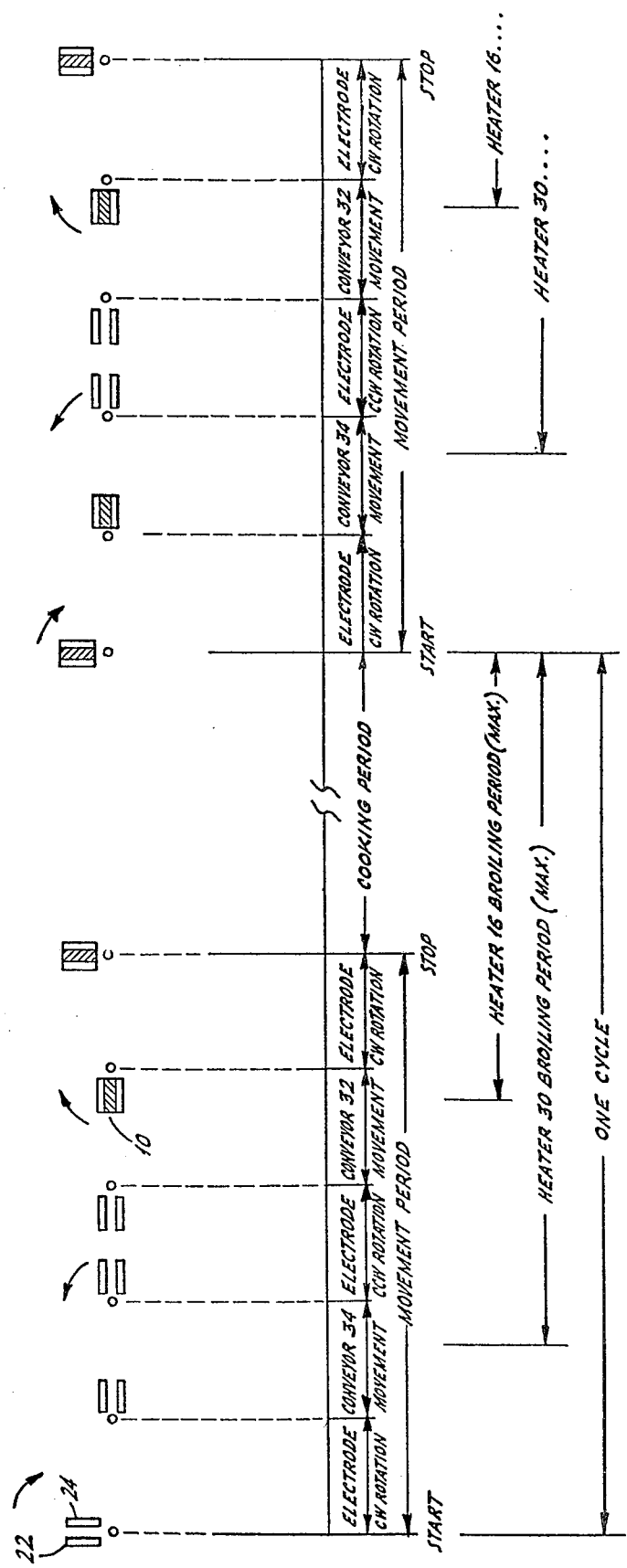
FIG. 6 is a time diagram illustrating the movement sequence of the conveying mechanism of the apparatus of the present invention.

The movements of input conveyor 32, output conveyor 34 and electrodes 22 and 24 are controlled precisely so that the timing of these movements and the positioning of these components bring rods 14 to rest at a position which permits fingers 22a of electrode 22 to pass through the plane of movement of rods 14 and bring rods 26 to rest at a position which permits fingers 24a of electrode 24 to pass through the plane of movement of rods 26. FIG. 6 illustrates the timing sequence of the movements of input conveyor 32, output conveyor 34 and electrodes 22 and 24 and the energization of radiant heaters 16 and 30 and electrodes 22 and 24. As depicted, an operating cycle of the cooking apparatus includes a Movement Period, a Cooking Period, and two Broiling Periods which overlap the Movement Period and the Cooking Period. Because the Broiling Periods typically are somewhat longer than the Movement Period, the time period during which the Broiling Periods and the Cooking Period overlap is shown with a break. For example, a typical Movement Period may be in the order of 10 seconds, while the Broiling Periods may be in the order of 40 seconds.

In FIG. 6, the cycle of operation starts with electrodes 22 and 24 in the cooking position, with no meat between the electrodes. Next, electrodes 22 and 24 swing together 90° clockwise, when viewed in FIG. 5, to a position in which fingers 24a of electrode 24 have passed between rods 26 and are below these rods, while fingers 22a of electrode 22 remain above rods 26. This pivotal movement of the electrodes occurs while output conveyor 34 is stationary. Next, output conveyor 34 is moved a fixed amount, namely the distance between two STATIONS (e.g. radiant heater 30 and opening 31) on the output side of the apparatus. After output conveyor 34 has moved this prescribed amount and comes to rest, electrodes 22 and 24 swing together counterclockwise 180° to a position in which fingers 22a of electrode 22 have passed between rods 14 and are below these rods, while fingers 24a of electrode 24 remain above rods 14. This rotation of the electrodes occurs while input conveyor 32 is stationary and before a piece of meat has been delivered by rods 14 to this location, namely STATION III (PICK-UP). After electrodes 22 and 24 are positioned at STATION III and with the electrode fingers separated, input conveyor 32 is moved to deliver a piece of meat 10 from STATION II (TOP SURFACE RADIANT BROILING) to STATION III. After input conveyor 32 has delivered a piece of meat to STATION III, input conveyor 32 is stationary, electrodes 22 and 24 come together as they swing clockwise 90° carrying the piece of meat away from STATION III to STATION IV for electric current cooking. This completes the Movement Period and starts the Cooking Period.

After the meat has been cooked, the Movement Period of the cycle is repeated. Specifically, electrodes 22 and 24, carrying the cooked piece of meat, swing 90° clockwise, with fingers 24a of electrode 24 passing between rods 26 of output conveyor 32. Electrodes 22 and 24 separate to deposit the meat on rods 26. Output conveyor 34 then is moved and carries the meat away from STATION V (DROP-OFF) to STATION VI for radiant broiling of the bottom surface of the meat which is now on top. After output conveyor 34 comes to rest, electrodes 22 and 24 swing together counterclockwise 180° to STATION III (PICK-UP) and come into position ready for the delivery of another piece of meat by input conveyor 32. In the meantime, with the meat at STATION VI, radiant heater 30 is energized and the meat is broiled. Radiant heater 30 is energized shortly before the meat is delivered to STATION VI to allow the heater to develop full intensity before conveyor 34 comes to a stop with the meat below the heater. Radiant heater 16 is operated in a similar manner. This heater is energized shortly before the meat is delivered to STATION II to allow the heater to develop full intensity before conveyor 32 comes to a stop with the meat below the heater.

Figure 7:
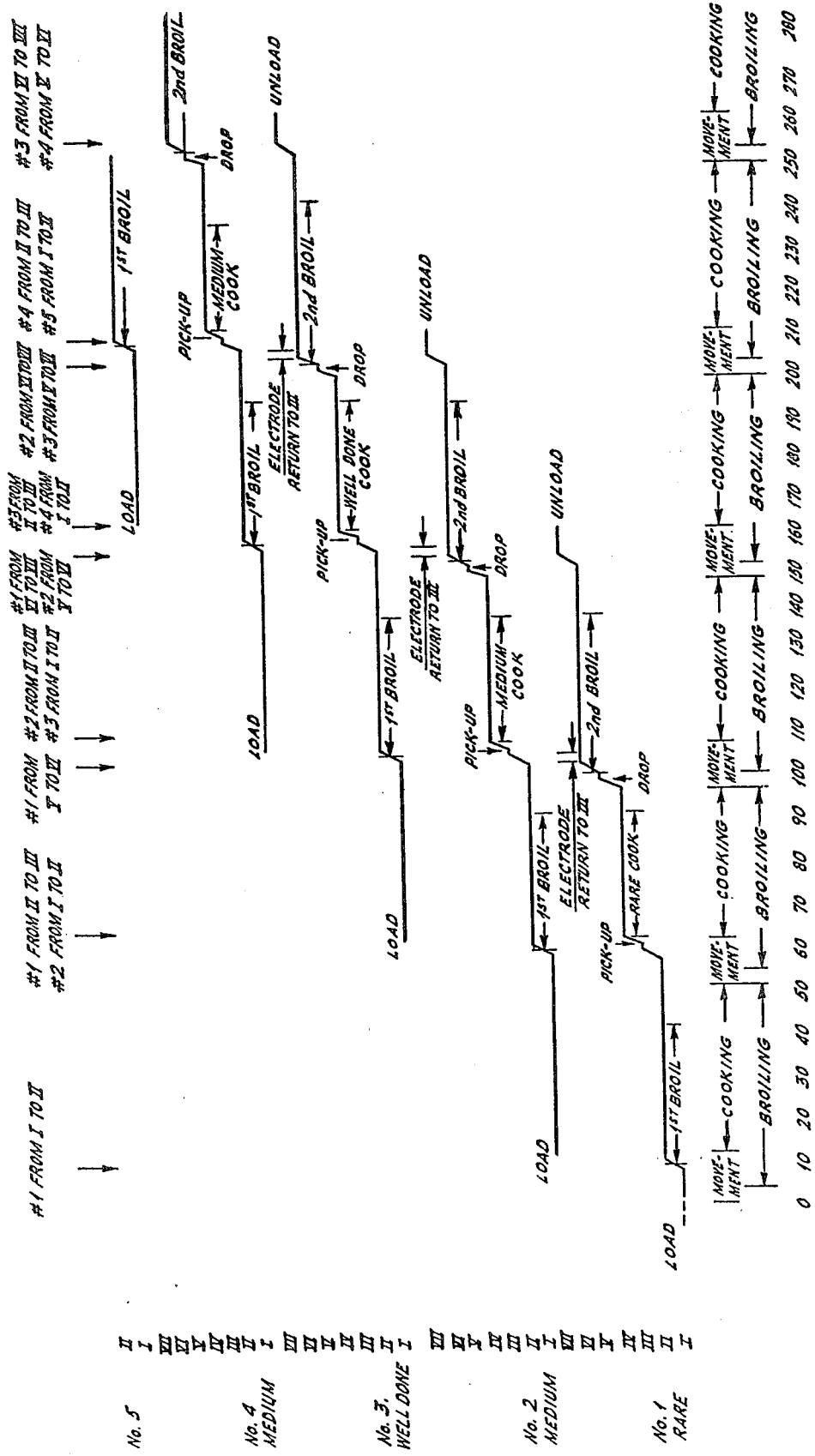
FIG. 7 is a time diagram illustrating the manner in which the apparatus of the present invention prepares a plurality of meat products.

FIG. 7 is a time diagram which illustrates the manner in which the apparatus of the present invention prepares a plurality of meat products. The horizontal axis of FIG. 7 represents time and indicates the Movement Periods, the Broiling Periods and Cooking Periods, while the vertical axis indicates the particular STATIONS at which different pieces of meat are located at any particular time. A first piece of meat (No. 1), which is to be "rare" cooked, is loaded into the cooking apparatus at STATION I. Meat No. 1 remains at STATION I for a designated period of time while the first three movements, shown in FIG. 6, take place. When input conveyor 32 moves, meat No. 1 moves from STATION I to STATION II. A second piece of meat (No. 2), which is to be "medium" cooked, now may be loaded into the cooking apparatus. During the first Movement Period, the first Broiling Period begins. Upon completion of the first Movement Period, the first Cooking Period begins. While meat No. 1 receives the top surface broiling at STATION II, meat No. 2 remains at load STATION I.

After the first Broiling Period and first Cooking Period are completed, a second Movement Period begins and after a designated period of time, input conveyor 32 moves carrying meat No. 1 from STATION II to STATION III and meat No. 2 from STATION I to STATION II. A third piece of meat (No. 3), which is to be "well-done" cooked, now may be loaded into the cooking apparatus. Meat No. 1 is in position to be picked up at STATION III, meat No. 2 is at STATION II receiving top surface broiling because the second Broiling Period has started, and meat No. 3 is at load STATION I. With input conveyor 32 stationary, the electrode heads pick meat No. 1 off of conveyor 32 and deliver meat No. 1 to STATION IV. Upon completion of the second Movement Period, the second Cooking Period begins. Meat No. 1 receives electric current cooking at STATION IV, meat No. 2 receives the top surface broiling at STATION II and meat No. 3 remains at load STATION I.

After the second Broiling Period and second Cooking Period are completed, a third Movement Period begins. The electrodes swing 90° clockwise to drop meat No. 1 on output conveyor 34 which is stationary. Next, output conveyor 34 carries meat No. 1 from STATION V to STATION VI. Upon delivery of meat No. 1 to STATION VI, output conveyor 34 stops. With output conveyor 34 stationary and input conveyor 32 also stationary, the electrodes swing through a 180° counterclockwise to position the electrodes at STATION III ready to receive meat No. 2. Next, input conveyor 32 moves carrying meat No. 2 from STATION II to STATION III and meat No. 3 from STATION I to STATION II. A fourth piece of meat (No. 4), which is to be "medium" cooked, now may be loaded into the cooking apparatus. Meat No. 1 is at STATION VI receiving bottom surface broiling because the third Broiling Period has started, meat No. 2 is in position to be picked up at STATION III, meat No. 3 is at STATION II receiving top surface broiling because the third Broiling Period has started, and meat No. 4 is at load STATION I. With input conveyor 32 stationary, the electrodes pick meat No. 2 off of conveyor 32 and deliver meat No. 2 to STATION IV. Upon completion of the third Movement Period, the third Cooking Period begins. Meat No. 1 receives bottom surface broiling at STATION VI, meat No. 2 receives electric current cooking at STATION IV, meat No. 3 receives top surface broiling at STATION II, and meat No. 4 remains at load STATION I.

After the third Broiling Period and third Cooking Period are completed, a fourth Movement Period begins. The electrodes swing 90° clockwise to drop meat No. 2 on output conveyor 34 which is stationary. Next, output conveyor 34 carries meat No. 1 from STATION VI to STATION VII and meat No. 2 from STATION V to STATION VI. Upon delivery of meat No. 1 to STATION VII and meat No. 2 to STATION VI, output conveyor 34 stops. With output conveyor 34 stationary and input conveyor 32 also stationary, the electrodes swing through a 180° counterclockwise are to position the electrodes at STATION III ready to receive meat No. 3. Next, input conveyor 32 moves carrying meat No. 3 from STATION II to STATION III and meat No. 4 from STATION I to STATION II. A fifth piece of meat (No. 5) now may be loaded into the cooking apparatus. Meat No. 1 is in position to be unloaded at STATION VII, meat No. 2 is at STATION VI receiving bottom surface broiling because the fourth Broiling Period has started, meat No. 3 is in position to be picked up at STATION III, meat No. 4 is at STATION II receiving top surface broiling because the fourth Broiling Period has started, and meat No. 5 is at load STATION I. With input conveyor 32 stationary, the electrodes pick meat No. 3 off conveyor 32 and deliver meat No. 3 to STATION IV. Upon completion of the fourth Movement Period, the fourth Cooking Period begins. Meat No. 2 receives bottom surface broiling at STATION VI, meat No. 3 receives electric current cooking at STATION IV, and meat No. 4 receives top surface broiling at STATION II. Meat No. 1 remains at unload STATION VII and meat No. 5 remains at load STATION I.

The cycling just described repeats to move the pieces of meat loaded into the cooking apparatus through the broiling and cooking STATIONS. If additional pieces of meat are not loaded into the cooking apparatus, the apparatus is cycled, in the manner described, until the last piece of meat is delivered at unload STATION VII.

Referring to FIG. 2, the operations previously described are regulated and initiated from two control panels. The first, designated by reference numeral 62, is a chef's control panel, through which certain of the operating conditions are set by a chef. For example, the power output and duration of radiation from radiant heaters 16 and 30 are preset by the chef to develop the level of broiling which produces the desired softening of the meat and the desired appearance of the meat. The chef also presets the various temperatures to which different pieces of meat should be cooked to achieve the desired degrees of cooking. In order to prevent unauthorized changes to these settings, chef's control panel 62, preferably is covered.

With the major operating conditions established and set into the cooking apparatus, individual pieces of meat may be prepared by unskilled operators who simply load pieces of meat and push various buttons consistent with the orders for the meat preparation. These buttons are located at an operator's control panel, designated by reference numeral 64. Thus, the operator merely makes the selection as to the degree of cooking desired and can start or stop the apparatus as needed. Although the embodiment of the cooking apparatus disclosed herein includes only three degrees of cooking, namely "rare", "medium", and "well-done", it will be understood that in practice, additional cooking degrees, such as "medium-rare" and "medium-well" will be desirable, and that such added flexibility is easily incorporated in the apparatus.

In order to keep track of the degree of cooking of various pieces of meat being prepared by the apparatus at the same time, a series of lights 66 are provided adjacent unload opening 31. As a cooked piece of meat reaches this opening, the appropriate light 66, corresponding to the degree to which the meat has been cooked, lights up, so that the operator may identify the meats with flags, taken from recesses 70, which indicate the cooking degree.

Figure 8:
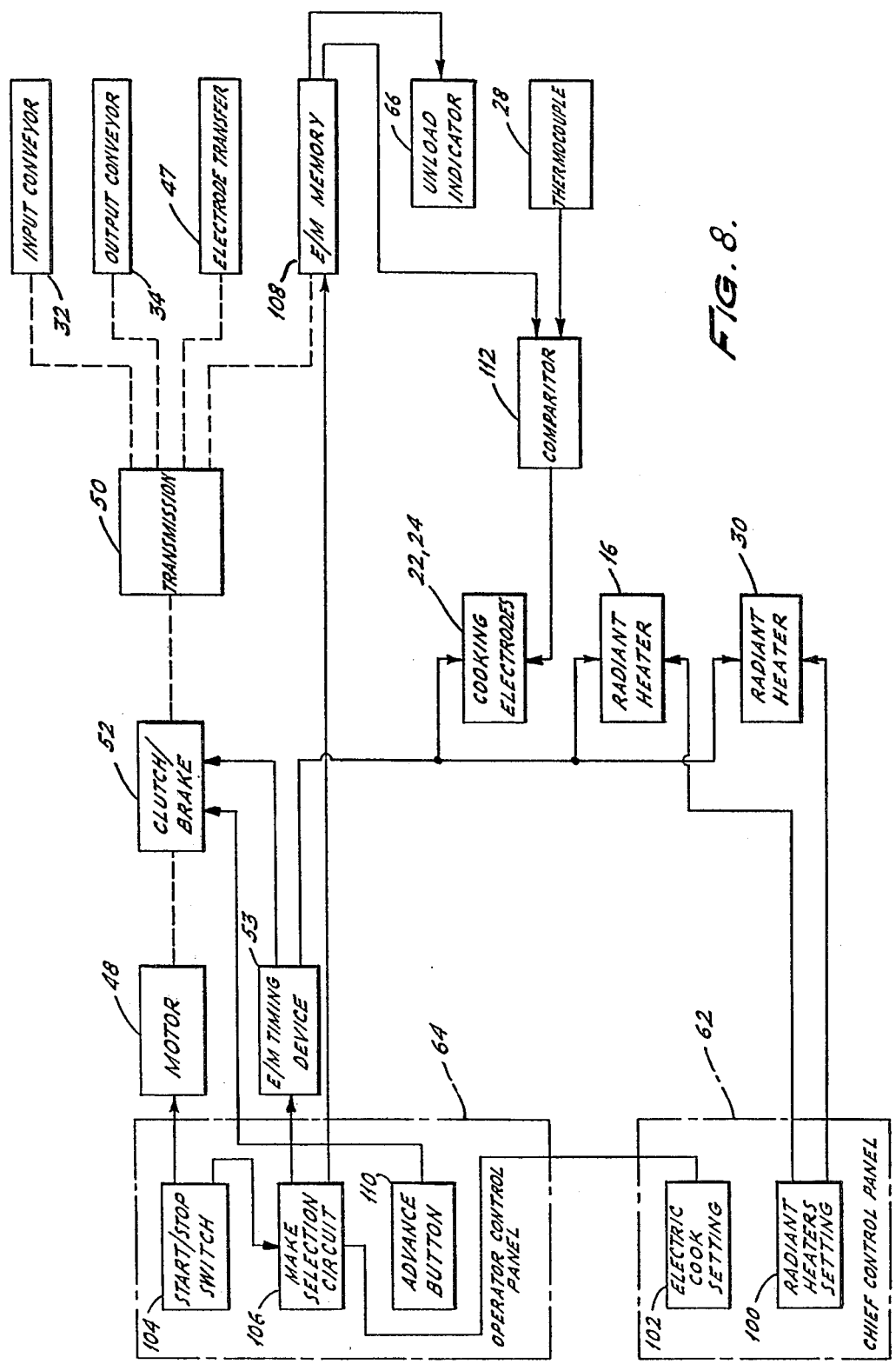
FIG. 8 is a block diagram which illustrates one embodiment of the control system of the present invention.

FIG. 8 is a block diagram illustrating one embodiment of a control system for the cooking apparatus of the present invention. Prior to using the cooking apparatus to prepare meat products, the chef sets various operating conditions by adjustments of dials located at chef's control panel 62. In particular, the power output and duration of radiation from radiant heaters 16 and 30 are set to develop the level of broiling required to produce the desired softening of the meat and the desired appearance of the meat. This setting control, represented by radiant heaters setting 100, is supplied to radiant heaters 16 and 30. The chef also presets the various temperatures to which different pieces of meat should be cooked to achieve the desired degrees of cooking, namely "rare", "medium" and "well-done". This setting control, represented by electric cook setting 102, is supplied to make selection circuit 106 located at operator's control panel 64.

Electric motor 48 is started by closing a start/stop switch 104 located at operator's control panel 64. This action readies the cooking apparatus for the cooking process and conditions make selection circuit 106 to receive a setting for the cooking degree selection. After the operator has loaded a piece of meat onto the input conveyor, he actuates the make selection circuit 106 by selecting the setting for the desired cooking degree which has been established by electric cook setting 102.

The output of make selection circuit 106 is supplied to clutch/brake 52 to disengage the brake and engage the clutch. The output of make selection circuit 106 also is supplied to electro-mechanical (E/M) timing device 53 to initiate the timing function of this unit. The output of make selection circuit 106 is also supplied to an electro-mechanical (E/M) memory 108 which stores a signal representative of the desired degree of cooking for the piece of meat loaded into the apparatus. Memory 108 may be a conventional memory drum in which information is stored at one or more discrete locations, so that as the drum rotates, in synchronism with mechanical transmission system 50, the stored information may be read from the drum and signals developed to control various components of the control system at the appropriate times.

With the clutch of clutch/brake 52 engaged, mechanical power transmission system 50 is driven to cycle electrode transfer 47, output conveyor 34 and input conveyor 32 in the manner illustrated in FIG. 6. At the same time, mechanical power transmission system 50 drives electro-mechanical memory 108 in synchronism.

After electro-mechanical timing device 53 has run down, the clutch of clutch/brake 52 is disengaged and the brake of clutch/brake 52 is engaged. Electromechanical timing device 53 also initiates the Broiling and Cooking Periods of the apparatus by supplying signals to cooking electrode heads 22 and 24, radiant heater 16 and the radiant heater 30.

At the completion of the Cooking Period, another cycle of operation may be initiated in one of two ways depending upon whether a second piece of meat is loaded into the unit. In the absence of a second piece of meat, the operator pushes an advance button 110, located at the operator control panel 64, and the same cycle, previously described, is repeated. If a second piece of meat is loaded into the apparatus, the operator again selects the cooking degree desired at the make selection circuit 106 and initiates the cycle previously described.

Whether by actuation of make selection circuit 106 or advance button 110, the piece of meat is delivered to cooking electrodes 22 and 24 and carried by the electrodes into the cooking position. As the apparatus is cycled, with the piece of meat passing through the apparatus, electro-mechanical memory 108 also moves in synchronism, so that when electric current cooking of the piece of meat is to take place, the memory supplies to a comparator 112 the stored signal representative of the desired degree of cooking. As electric current is passed between electrode fingers 22a and 24a through the meat, thermocouple 28 senses the interior temperature of the meat. Comparator 112 controls the duration of time over which electric current is passed through the meat in response to a comparison of the thermocouple signal and the signal from electromechanical memory 108. When the two signals are equal the comparator turns off the electric current.

After the Cooking Period is over, the cooking apparatus is again cycled either by actuation of make selection circuit 106, if another piece of meat is to be cooked, or by advance button 110 the necessary number of times until the piece of meat is delivered to the unload location. Electro-mechanical memory 108, moving in synchronism with the various components of the conveying mechanism, supplies a signal to unload indicator 66 to indicate the degree of cooking of the meat. The operator, with the benefit of this indication, identifies the meat with a suitable flag representing this degree of cooking.

In the embodiment of the control system illustrated in FIG. 8, radiant heaters 16 and 30 and electrodes 22 and 24 are activated during each Broiling Period and each Cooking Period regardless of the presence of a piece of meat at these locations. In order to conserve energy and minimize the heating of the cooking apparatus, additional control connections are effected through electromechanical memory 108 to separately control the operations of radiant heaters 16 and 30 and electrodes 22 and 24, so that these components are powered only when a piece of meat is at any of the three locations.

Figure 9A:
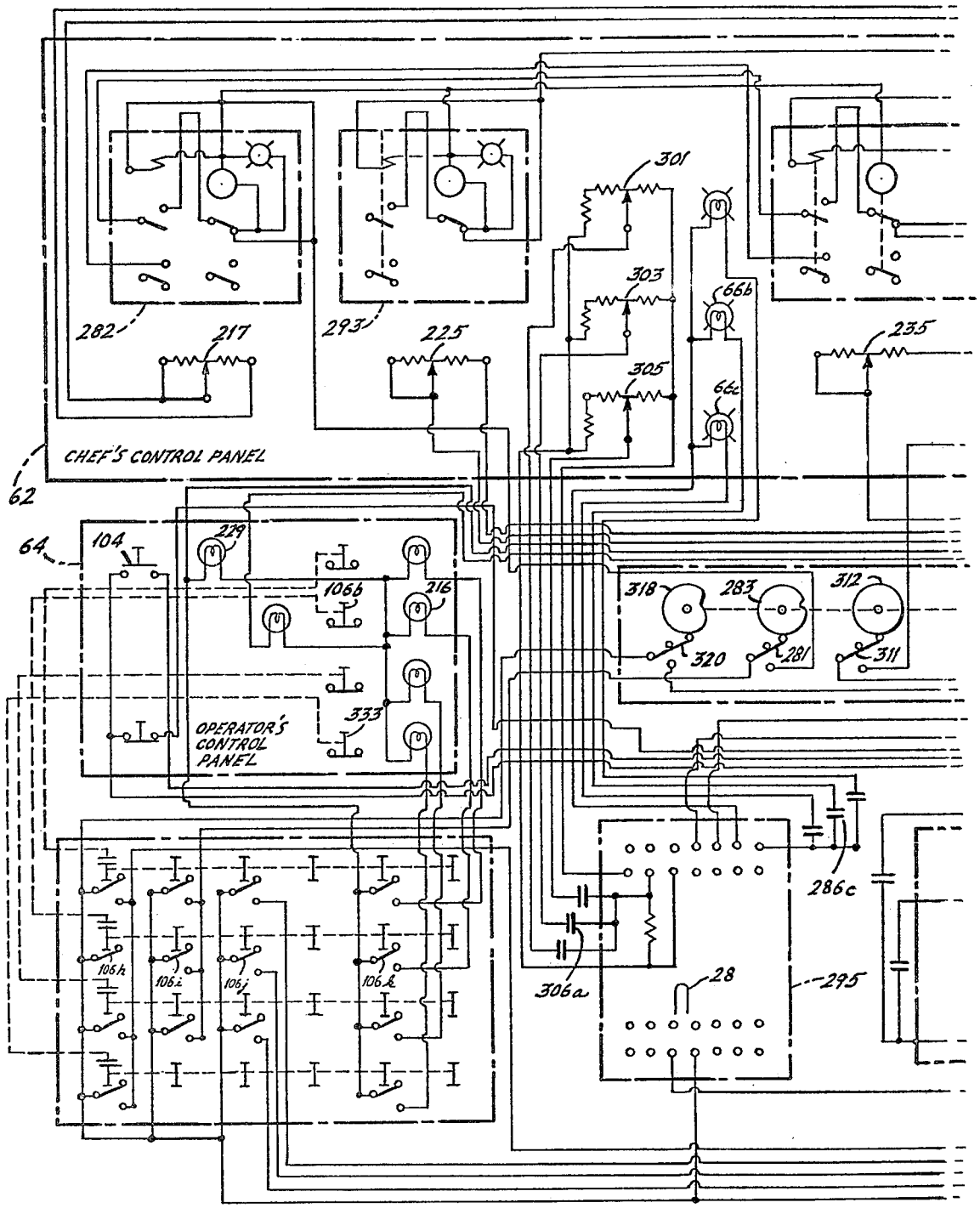
FIGS. 9a and 9b are circuit diagrams showing the details of the circuitry of the FIG. 8 block diagram.
Figure 9B:
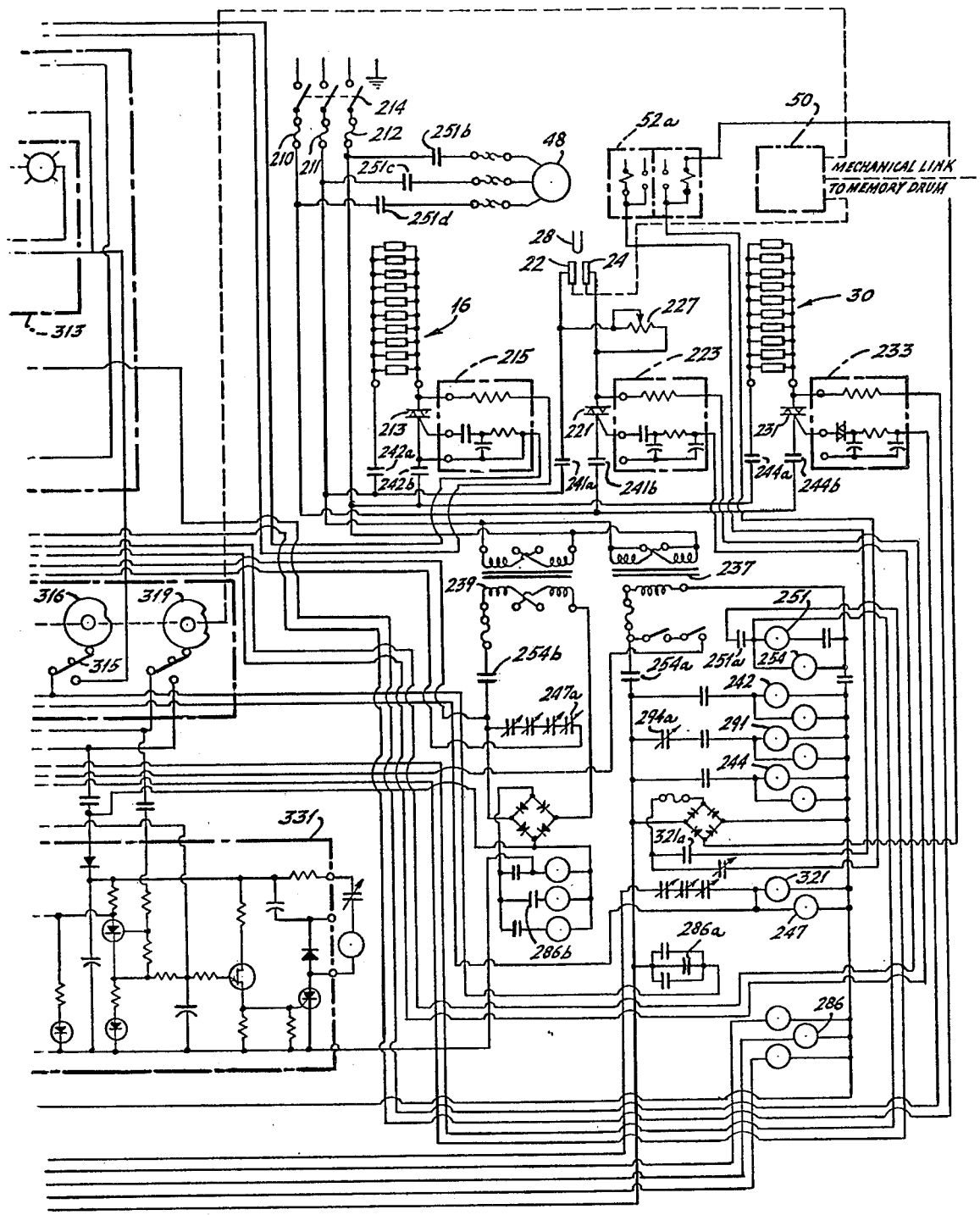

FIGS. 9a and 9b show the circuit details of the FIG. 8 control system. Only selected portions of the circuitry shown in FIGS. 9a and 9b need to be described to provide an adequate understanding of the operation of the control system.

The main power is supplied from a 240 volt, 60 cycle, three phase source. This power is supplied through a power switch 214 and three fuses 210, 211 and 212.

The amount of power supplied to radiant heaters 16 and 30 is controlled by triacs 213 and 231, respectively, which are operated as phase-controlled switches and controlled by standard triac phase control circuits 215 and 233, respectively. A pair of rheostats 217 and 235, located at chef's control panel 62, are set by the chef to establish the parameters of triac phase control circuits 215 and 233, respectively, thereby determining the amount of power supplied to radiant heaters 16 and 30, respectively. The time over which power is supplied to radiant heaters 16 and 30 is established by the chef by setting a pair of timers 282 and 313, also located at chef's control panel 62. These two timers are commercially available, motor driven timers, such as Eagle Signal Cycl-Flex Timer HP 52A6.

The power supplied to electrodes 22 and 24 is controlled by a triac 221 which is operated as a phase-controlled switch and controlled by a standard triac phase control circuit 223. A rheostat 225, located at chef's control panel 62, is set by the chef to establish the parameters of triac phase control circuit 223 and, thereby, establish the power to electrodes 22 and 24. The maximum time over which power is supplied to electrodes 22 and 24 is established by the chef by setting a timer 293, also located at chef's control panel 62. This timer is set beyond the time required to cook a piece of meat "well-done". Timer 293 is similar in construction and operation to timers 282 and 313.

The chef also sets three potentiometers 301, 303 and 305, located at the chef's control panel 62, for the preset electric current cooking conditions corresponding to "rare", "medium" and "well-done". The settings of these potentiometers establish voltage levels which are selectively supplied to a temperature control circuit 295 depending upon the desired degree of cooking for a given piece of meat.

Actuation of start/switch 104 energizes a relay 251 which closes relay contacts 251a, 251b, 251c and 251d, thereby connecting motor 48 to the main power supply. Actuation of start switch 104 also energizes a relay 254 which closes relay contacts 254a and 254b, to connect various other control components, such as relays, to the secondaries of transformers 237 and 239. Transformer 237 is part of a 120 volt circuit and transformer 239 is part of a 24 volt circuit. These two circuits power the control components as they are selectively actuated to effect the desired operations.

When the operator presses, for example, "medium" switch 106b of make selection circuit 106 a number of connections are effected. Switch blade 106g closes to energize "medium" light 216 at the operator's control panel 64. Switch blade 106h closes to energize relay 247 which opens relay contact 247a, thereby, turning off make selection light 229 at the operator's control panel 64. The closing of switch blade 106h also energizes relay 321 which closes relay contact 321a, thereby energizing clutch 52a of clutch/brake 52. When clutch 52a is energized, cams 318, 382, 312, 316 and 319, mechanically ganged together, rotate a prescribed amount. Cam 318 closes a cam switch 320 which provides holding contact for relays 247 and 321.

Pressing "medium" switch 106b also closes switch blade 106i which is located within electro-mechanical memory 108. When this switch blade is closed, power is applied through a cam switch 281, which has been closed by the rotation of cam 283, to timer 282 for controlling radiant heater 16. Cam switch 281 is actuated by cam 283 only during the time that power may be supplied to radiant heater 16 for top surface broiling. While timer 282 runs down, power is supplied to radiant heater 16.

Pressing "medium" switch 106b also closes switch blade 106j to energize relay 286 which closes relay contacts 286a, 286b and 286c. The closing of relay contact 286a causes power to be applied through a cam switch 315, which has been closed by the rotation of cam 316, to timer 313 for controlling radiant heater 30. Cam switch 315 is actuated by cam 316 only during the time that power may be supplied to radiant heater 30 for bottom surface broiling. The closing of relay contact 286a also causes power to be applied through a cam switch 311, which has been closed by the rotation of cam 312, to timer 293 for controlling the current flow between electrode fingers 22a and 24a. Cam switch 311 is actuated by cam 312 only during the time that power may be supplied to electrode fingers 22a and 24a. The closing of relay contact 286b causes a relay 306 to be energized which closes relay contact 306a. This action selects the proper preset potentiometer 303, corresponding to "medium" cooking. The closing of relay contact 286c energized "medium" light 66b of unload indicator 66.

While timers 282 and 313 are running down, relays 242 and 244 are energized which closes relay contacts 242a, 242b and 244a, 244b, respectively, to supply power to radiant heaters 16 and 30, respectively. This is so because relay contacts 340a and 342a, in series with relays 242 and 244, respectively, are closed as a result of timers 282 and 313 being on. While timer 293 is running down, a relay 291 is energized which closes relay contacts 291a and 291b to supply power to electrodes 22 and 24. This is so because relay contact 344a, in series with relay 291, is closed as a result of timer 293 being on. Thus, power is supplied to radiant heaters 16 and 30 and electrodes 22 and 24 only if the associated relay contacts 340a, 342a and 344a are closed to permit relays 242, 244 and 291 to be energized. Relay contacts 340a, 342a and 344a are selectively closed only if the associated timers 282, 313 and 293 are running. In this way, power is only applied to radiant heaters 16 and 30 and electrodes 22 and 24 when needed to broil or cook a piece of meat at these locations as indicated by the activation of timers 282, 313 and 293.

The signal from thermocouple 28 and the output of potentiometer 303 are supplied to temperature control circuit 295 and compared. When the thermocouple signal reaches the preset level established by potentiometer 303, temperature control circuit 295 causes a relay contact 294a to open, thereby de-energizing relay 291. This, in turn, opens relay contacts 291a and 291b to stop the current flow between electrode fingers 22a and 24a. In no event will the current flow between electrode fingers 22a and 24a continue after the run down of timer 293, since this timer, at the completion of run down, also will de-energize relay 291. The running time of time 293 is set for a period longer than that required for "well-done" cooking.

At the completion of a Movement Period, cam 318 permits cam switch 320 to open. This causes relays 247 and 321 to be deenergized, thereby de-activating clutch 52a.

If instead of cooking a piece of meat "medium", the meat is to be cooked "well-done", the same operation, just described, takes place, excapt that an indicator light 66c, corresponding to the "well-done" cooking condition is energized and the output of potentiometer 305, preset for "well-done" cooking, is supplied to temperature control circuit 295.

For a "rare" cooking, the action again is similar to that described except that a time delay circuit 331 comes into operation. This time delay circuit is provided to delay the start of the meat temperature sensing by thermocouple 28 for a prescribed time, approximately three seconds, after the Cooking Period has begun. This delay is introduced because it has been found that the ambient temperature in the cooking area may rise above the preset "rare" temperature setting so that, under such conditions, it is necessary to insert the thermocouple into the piece of meat before activating temperature control circuit 295.

When a second piece of meat is not introduced into the cooking apparatus, pushing advance button 333 causes the circuit to operate in the same manner as described above except that power to radiant heater 16 is not applied.

The cooking apparatus of the present invention also may include a trough system for flowing cold water beneath the path of meat movement through the apparatus. The flowing cold water serves a number of purposes. First, meat drippings are carried away by the water flow. Second, the cold water cools the apparatus. Third, the water surface is highly reflective and enhances the effectiveness of the radiant heaters. Fourth, the water increases the moisture within the apparatus and improves the cooking quality of the meat.

The cold water is introduced into a pair of troughs located beneath the upper paths of travel of rods 14 and 26. Only one such trough 72, associated with output conveyor 34, is shown n FIG. 5. The water flowing through these two troughs flows into a tank 70 and is discharged through outlet 92. In this way, meat drippings are removed from the cooking apparatus.

The cooking apparatus includes a second pair of troughs associated with the input and output conveyors. Only one such trough 90, associated with input conveyor 32, is shown in FIG. 5. Hot water, at a temperature of approximately 180° F., is introduced by suitable means to these troughs. As the rods 14 and 26 and their associated drive chains pass through this hot water, the rods and chains are cleaned. This water is discharged through outlets 76 and 78.

It is preferable, from the standpoint of energy conservation, to enclose the various components of the apparatus within a housing. By keeping the broiling and cooking areas warm and humid, the meat preparation uses less energy and produces a better product. In order to afford access to the interior of the apparatus, a pair of doors 80 and 82 are provided. When elevated, these doors, may be held in position by guide rods 84 and 86, respectively.

Meat prepared by the embodiment of the cooking apparatus just described chars only one surface, namely the top surface 10b of the meat as it is carried by output conveyor 34. If it is desired to char both the top and bottom surfaces, a third radiant heater 88, shown in dotted lines in FIG. 3, may be positioned below rods 26 at STATION VI. This heater, in alignment with radiant heater 30, would be energized whenever heater 30 is energized, so as to produce a piece of meat charred on both top and bottom surfaces.

From the foregoing description, it is seen that the present invention provides an efficient and effective apparatus and method for preparing meats in large quantities with each piece of meat being pleasing to the consumer. For the embodiment of the invention described, an unskilled operator can prepare pieces of meat which satisfy the concurrent requirements of proper doneness and appealing appearance at the rate of approximately seventy pieces per hour, although much higher rates are possible with suitable modifications to the apparatus. Also, it has been found that meats prepared according to the present invention undergo minimum moisture loss. This permits preparing properly sized portions from properly sized pieces of raw meat.

While the foregoing description discloses a preferred embodiment of the present invention, it will be obvious to one skilled in the art that various modifications may be made which are within the intended scope of the invention as set forth in the appended claims.

What is claimed is:

1. A method of cooking meat comprising the steps of:
    subjecting said meat to surface cooking by radiation in a first radiation cooking region, said surface cooking being concentrated substantially on a first side only of said meat in said first radiation cooking region leaving the opposite side of said meat substantially, unradiated;
    moving said meat to a further cooking region;
    clamping said meat between two electrodes in said further cooking region;
    passing electric current through said meat between said electrodes to provide cooking throughout the thickness of said meat;
    subjecting said meat to surface cooking by radiation applied substantially on said opposite side in a second radiation cooking region; and
    wherein said opposite side radiation step is conducted following said electric current passing step, and wherein said second radiation cooking region is different from said first radiation cooking region and said further cooking region.

2. The method of cooking meat of claim 1 wherein said meat is substantially horizontal during said surface cooking by radiation in said first radiation cooking region, and is substantially horizontal but inverted during said surface cooking by radiation in said second radiation cooking region, said radiation being applied to said meat from above in each of said first and second radiation cooking regions.

3. The method of cooking meat of claim 2, wherein said meat is stationary during said cooking by radiation in each of said first and second radiation cooking regions.

4. The method of cooking meat of claim 3, wherein said meat is softened and its surface is broiled during said surface cooking by radiation in said first radiation cooking region.

5. The method of cooking meat of claim 4 wherein said opposite side surface is broiled during said surface cooking by radiation in said second radiation cooking region.

* * * * *